United States Patent [19]
Glenn, Jr. et al.

[11] 4,203,298
[45] May 20, 1980

[54] SOLAR AIR CONDITIONING METHOD AND APPARATUS

[75] Inventors: William E. Glenn, Jr., Ft. Lauderdale; Carl A. Ludeke, Dania, both of Fla.

[73] Assignee: New York Institute of Technology, Old Westbury, N.Y.

[21] Appl. No.: 912,429

[22] Filed: Jun. 5, 1978

Related U.S. Application Data

[62] Division of Ser. No. 768,058, Feb. 14, 1977, Pat. No. 4,121,428.

[51] Int. Cl.² .............................................. F25B 27/00
[52] U.S. Cl. .......................................... 62/2; 62/271; 62/309
[58] Field of Search ............................. 62/2, 271, 309; 126/270

[56] References Cited
U.S. PATENT DOCUMENTS

| 2,138,690 | 11/1938 | Altenkirch | 62/2 |
| 3,470,708 | 10/1969 | Weil et al. | 62/271 |

Primary Examiner—William E. Wayner
Attorney, Agent, or Firm—Martin Novack

[57] ABSTRACT

A method and apparatus for cooling internal environment air using energy from the sun. In accordance with the method of the invention, internal environment ("inside") air is circulated over a desiccant and thereby dried. The dried air, which takes on heat as a consequence of the drying operation, is relatively cooled by performing a heat exchange operation with external environment ("outside") air. At this stage, the dried inside air is at a temperature which is only slightly above the temperature of the outside air. Moisture is then added to the dried inside air which had been subjected to the heat exchange operation. The evaporation of the moisture into the dried air restores it to a desired relative humidity and effects a cooling of the air which is then returned to the internal environment. The operation of drying the inside air will, after a time, render the desiccant too wet to perform efficiently. The desiccant is then heated with solar energy so as to remove moisture from the desiccant. In the preferred embodiment of the method of the invention, the desiccant is cooled, after the drying thereof using solar energy, by performing a heat exchange with outside air. In this embodiment, the two heat exchange operations, viz. cooling the dried room air and cooling the dried desiccant, are performed simultaneously.

14 Claims, 2 Drawing Figures

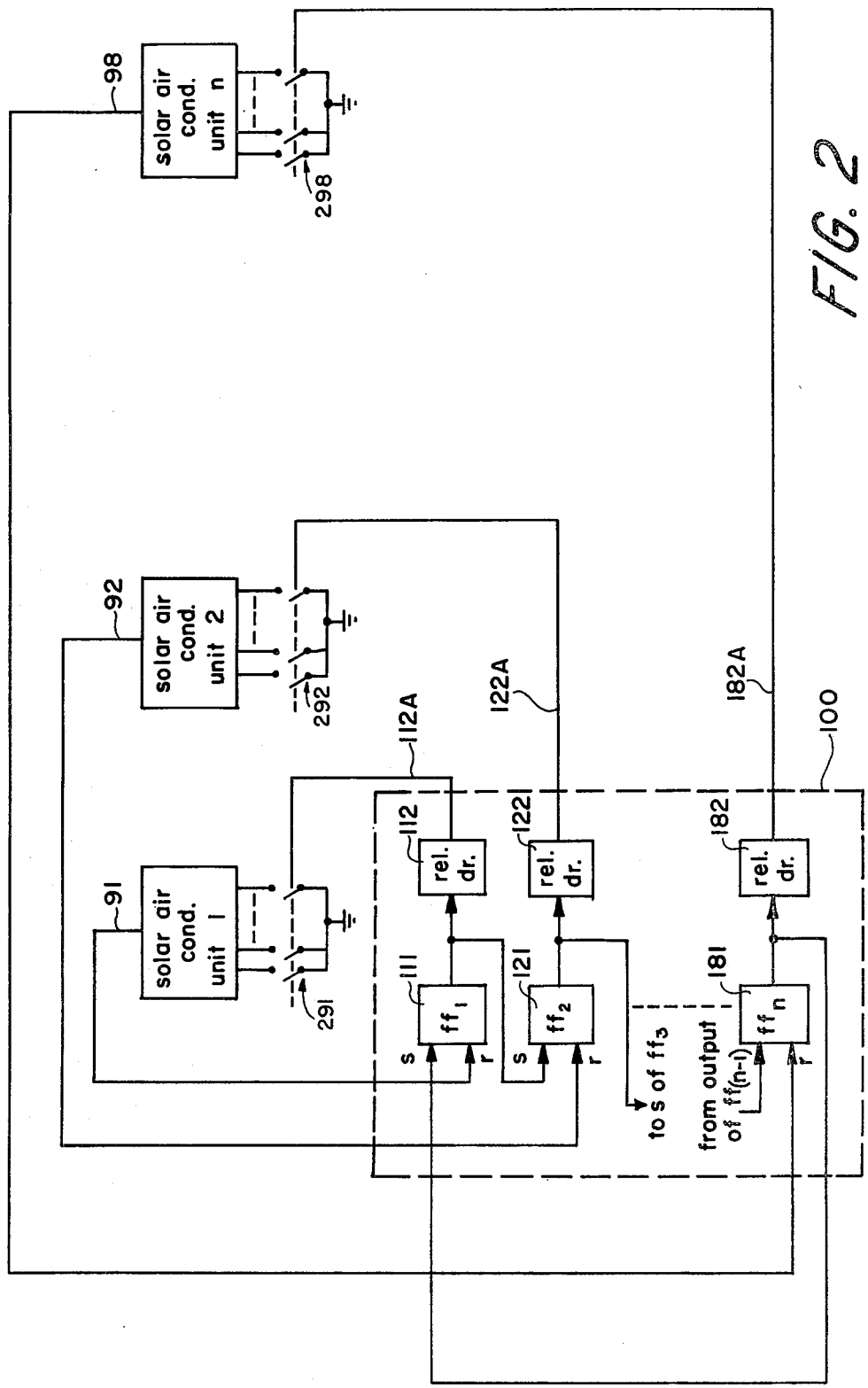

SOLAR AIR CONDITIONING METHOD AND APPARATUS

This is a division of application Ser. No. 768,058, filed Feb. 14, 1977, now U.S. Pat. No. 4,121,428.

BACKGROUND OF THE INVENTION

This invention relates to air conditioning techniques and, more particularly, to solar air conditioning method and apparatus.

In recent years the high cost of conventional sources of energy has spawned numerous schemes for harnessing the sun's energy. However, a number of factors have prevented widespread adoption of solar energy systems. Many of the proposed schemes involve apparatus which is either complex or has expensive component materials, and even the prospect of virtually "free" energy from such systems after installation does not overcome the inordinate investment required to purchase and install the systems. Other schemes involve large-area collectors which are often either impractical due to their space requirements or are unsightly. Also, many of the proposed schemes have proved to be inefficient in operation in that they themselves require a substantial portion of the energy generated, such as to run moving parts.

One or more of the above-listed problems pervade existing solar energy schemes for producing heat or electricity, but the same problems are especially severe when attempting to utilize solar energy for air conditioning, since techniques to obtain cooling can tend to be particularly inefficient. Also, existing evaporative cooling systems typically require high pressure plumbing connections which can be disadvantageous. Notwithstanding these problems, the prospect of attaining a reasonably efficient and inexpensive solar air conditioning technique, especially in warm climates where anticipated year-round usage would justify substantial initial capital investment, is particularly attractive. As fossil fuel costs rise, the need for a practical solar air conditioning technique is increasingly felt, especially in such warm climates where air conditioning consumes a high percentage of total power company outputs.

It is an object of this invention to provide solution to the prior art problems as set forth.

SUMMARY OF THE INVENTION

The present invention is directed to a solar air conditioning method and apparatus which requires a minimum of moving parts, is relatively efficient, can be constructed in a manner which is not aesthetically displeasing, and is inexpensive to install.

In accordance with the invention, there is disclosed a method and apparatus for cooling internal environment air using energy from the sun. In accordance with the method of the invention, internal environment ("inside") air is circulated over a desiccant and thereby dried. The dried air, which takes on heat as a consequence of the drying operation, is relatively cooled by performing a heat exchange operation with external environment ("outside") air. At this stage, the dried inside air is at a temperature which is only slightly above the temperature of the outside air. Moisture is then added to the dried inside air which had been subjected to the heat exchange operation. The evaporation of the moisture into the dried air restores it to a desired relative humidity and effects a cooling of the air which is then returned to the internal environment. The operation of drying the inside air will, after a time, render the desiccant too wet to perform efficiently. The desiccant is then heated with solar energy so as to remove moisture from the desiccant.

In the preferred embodiment of the method of the invention, the desiccant is cooled, after the drying thereof using solar energy, by performing a heat exchange with outside air. In this embodiment, the two heat exchange operations, viz. cooling the dried room air and cooling the dried desiccant, are performed simultaneously.

In accordance with the apparatus of the invention, there is provided a central member having top and bottom surfaces, the top surface being rendered radiation-absorbing. A top member, which is substantially transmissive of solar radiation, is disposed above the top surface of the central member and spaced therefrom, so as to define a first air chamber as between the central and top members. A bottom member is disposed below the bottom surface of the central member and spaced therefrom so as to form a second chamber. A desiccant is disposed in the second chamber. The desiccant is preferably being coupled, from a heat transmission standpoint, to the central member, such as by applying it to the bottom surface of the central member. Finally, means are provided for periodically circulating inside air through the second chamber.

In a preferred embodiment of the apparatus of the invention, means are provided for periodically circulating outside air through the first chamber, this preferably being done simultaneously with the circulation of inside air through the second chamber. Means are also provided for periodically communicating the second chamber with the external environment. In accordance with the previously stated method, the circulation of inside air through the second chamber achieves drying of the inside air; periodic circulation of outside air through the first chamber (during circulation of inside air through the second chamber) achieves a heat exchange of the dried room air; and periodically communicating the second chamber with the outside environment allows heat drying of the desiccant since the central member is heated by solar energy. During the heating of the desiccant, circulation in the first chamber is discontinued such that heat builds up in the first chamber and sufficient heating of the desiccant is achieved.

Further features and advantages of the invention will become more readily apparent from the following detailed description when taken in conjunction with the accompanying drawings.

BRIEF DESCRIPTION OF THE DRAWINGS

FIG. 2 is a block diagram useful in describing operation of a solar air conditioning system which includes a plurality of units of the type shown in FIG. 1.

DESCRIPTION OF THE PREFERRED EMBODIMENT

Figure 1:
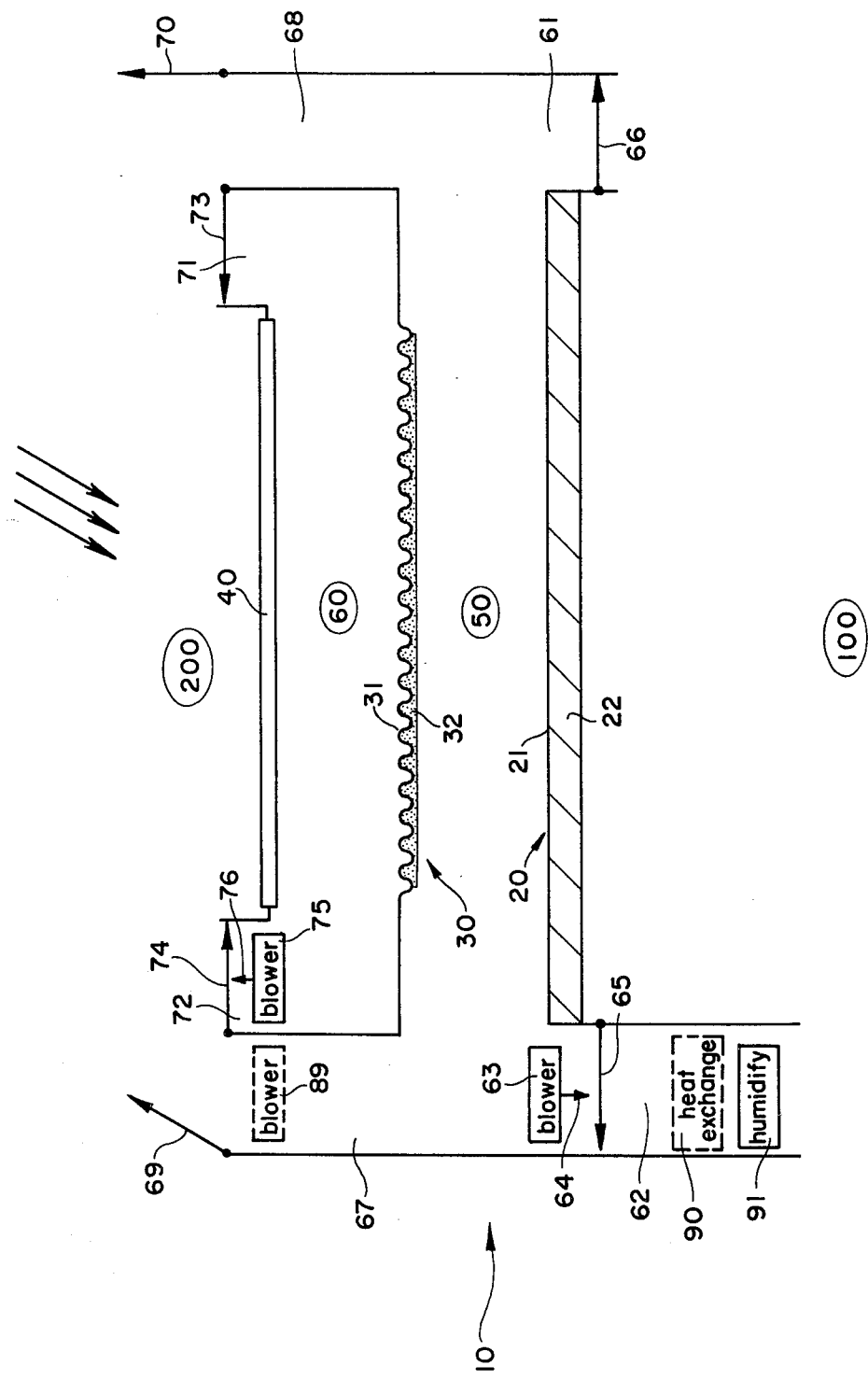
FIG. 1 is a cross-sectional view, partially in schematic form, of a solar air conditioning apparatus in accordance with the invention.

Referring to FIG. 1, there is shown a cross-sectional view, partially in schematic form, of a solar air conditioning apparatus 10 in accordance with the invention. The system can be best envisioned as a portion of a roof structure with the external environment 200 being outside air and the internal or inside environment 100 being room air, although it will be understood that these conditions are indicated for purposes of illustration and alternative modes of use are possible. In this context, references to "top", "center", and "bottom" members, or the like, are utilized for convenience of explanation and not in a limiting sense. A bottom member 20, which may comprise a structural portion of a roof, or be mounted thereon, includes a generally planar rigid wall 21 which constitutes the bottom wall of an enclosure which shall be referred to as a lower chamber or second chamber 50. Insulating layer 22 is disposed between the wall 21 and the room environment 100.

Spaced from the bottom member 20 is a central member 30 which includes a corrugated metal wall 31 that constitutes the top wall of the lower chamber 50. The wall 31 is typically mounted and supported on the wall 21 by side walls (not shown) which constitute the side walls of the lower chamber 50 and may be formed of any suitable rigid material. A desiccant 32, which may be any suitable desiccant such as silica gel, is disposed in the lower chamber 50. In the present embodiment the desiccant is disposed on the bottom of the wall 31 by adhering it thereto using an adhesive material such as RTV silicone rubber. It will be understood, however, that alternative techniques for disposing the desiccant in the lower chamber 50 can be employed. The top surface of the wall 31 is rendered radiation-absorbing, such as by painting it black, or by any suitable means.

The wall 31 of the central member 30, in addition to constituting the top wall of the lower chamber 50, also serves as the bottom wall of a chamber which is referred to as the upper chamber or second chamber 60. In the present embodiment, the top wall 40 of the upper chamber 60 comprises a transparent member, which may be formed of glass. The transparent member 40 serves to transmit radiation from the sun which is generally absorbed by the black metal wall 31. The composition, structure, and/or coating of member 40 are preferably selected so as to minimize heat loss due to reflection or reradiation. The member 40 is supported by any suitable side wall structure (not shown).

The lower chamber 50 communicates with the room environment, indicated generally by reference numeral 100, via two ports 61 and 62. A suitable blower or fan 63 is mounted in the port 62 and is operative to force air in the direction indicated by the arrow 64. An air valve 65, shown in its normally closed position, serves to prevent communication between the lower chamber 50 and the room environment during portions of the cycle to be described. Another air valve, 66, which may be under the same control as the air valve 65, is positioned in the port 61. A pair of ports 67 and 68 communicate between the lower chamber 50 and the outside environment, indicated generally by the reference numeral 200. These ports have respective air valves, 69 and 70, also under common control.

The upper chamber 60 communicates with the outside environment 200 via ports 71 and 72 which have air valves 73 and 74 associated therewith. A blower unit 75 is positioned at the port 72 and, when operative, serves to force air in the direction represented by arrow 76. A heat exchanger 90 and humidifier 91, represented in block form in FIG. 1, are located in series at the outlet side of port 62. The heat exchanger, which typically exchanges heat to the outside environment through a suitable barrier and is described further hereinbelow, is shown in dashed line and is an optional element needed only under circumstances when the heat exchange through wall 31 is inadequate.

Operation of the apparatus of FIG. 1, in accordance with the method of the invention, is as follows: Assume, initially, that the desiccant is relatively dry. The air valves 69 and 70 are closed and the air valves 65, 66, 73 and 74 are opened and the blowers 63 and 75 are activated. Accordingly, room air to be cooled enters the port 61 and is forced by action of the blower 64 through the lower chamber and out of the port 61 and back into the room environment via the humidifier 91. Simultaneously, outside air is, by operation of blower 75, drawn into the port 71 and circulated through the upper chamber to exit via the port 72. Room air circulating through the lower chamber 50 is dried by the desiccant 32. By virtue of this drying operation the room air takes on heat, which would typically tend to raise the temperature of the dried room air to a reading higher than the outside air. Since outside air is now circulating through the upper chamber, a heat exchange is effected through the wall 31, so that the temperature of the dried room air, while still typically higher than the temperature of outside air, is at a substantially lower temperature than it would be in the absence of the effective heat exchange operation. Additional heat exchange can, if desired, be provided by the unit 90. The dried and cooled (in a relative sense) room air is passed through the humidifier 91 wherein the air humidity is restored. This operation of humidifying air which has been dried to a relatively low humidity (typically below about 30%) serves to substantially cool the air, the result being saturated air which is substantially cooler than the room air which originally entered the port 61. As is well known, the operation of taking on moisture cools the air (as the operation of giving up moisture had warmed the air—as referred to above).

The described operation can continue efficiently only so long as the desiccant removes sufficient moisture from the room air. During the next phase of operation, the desiccant 32 is dried using heat from the sun. The air valves 65, 66, 73 and 74 are placed in the closed position and the air valves 69 and 70 are opened, these positions being the same as those shown in FIG. 1. During this phase, there is no circulation in the upper chamber and radiation from the sun heats the wall 31 to a very high temperature, typically above 150° F. The corrugations of wall 31 serve to maximize its heat-absorbing area and the effective area on which the desiccant can be disposed. Heat transmitted through the wall 31 serves to "bake out" the desiccant. The lower chamber 50 is in communication with the outside environment 200 (since air valves 69 and 70 are opened) and convection currents cause a degree of circulation in the lower chamber so that the moisture baked out of the desiccant is removed to the outside environment. If the unit is mounted horizontally, or there are inadequate convection currents for other reasons, a small optional blower may be activated. At the completion of this phase, the room air drying and cooling phase is reentered as initially described.

FIG. 2 illustrates an apparatus having a plurality of units of the type described in conjunction with FIG. 1. The units are controlled in such a manner that they perform the phases of the described cycle at different times. The cycle control for each unit is readily achieved utilizing a bank of relays under a single control. For example, in the described embodiment of the invention, the air valves and blowers have the following statuses during the cycle:

Air Drying and Cooling Phase:
 air valves 69, 70—closed
 air valves 65, 66, 73, 74—opened
 blowers 63, 75—on
 blower 92 (optional)—off
Desiccant Bake-Out Phase:
 air valves 65, 66, 73, 74—closed
 air valves 69, 70—opened
 blowers 63, 75—off
 blower 92 (optional)—on Each of the air valves and blowers assumes a different status during the two phases, so eight relays 291, 292 . . . 298 are readily utilized to attain the desired control, each of the relays being connected in a sense which is consistent with the above listing and under control of a single signal. In FIG. 2, n solar air conditioning units are shown (only three being illustrated for clarity) and the control lines are the lines 112A, 122A . . . 182A which respectively control the relays 291, 292 . . . 298. The presence of a signal on a control line causes its associated unit to enter the air drying and cooling phase (by opening air valves 65, 66, 73 and 74 and turning blowers 63 and 75 on, and closing air valves 69 and 70) while the absence of a signal on the control line is operative to cause the associated unit to enter the desiccant drying phase (by effecting the opposite results via the relays). For a group of n units, and depending upon the relative effective time for the desiccant (which depends, inter alia, upon rate of air flow, condition of the air being dried, and the desired level of drying), the "bake-out" portion of the cycle will typically require a substantially longer time. Accordingly, in the embodiment of FIG. 2, a sequencer circuit 100 is utilized to activate one unit at a time to its air drying and cooling phase while the remaining units are in the bake-out phase. Control signals 91, 92 . . . 98 from units 1, 2 . . . n, respectively, are coupled to the "reset" inputs of flip-flops 111, 121 . . . 181, respectively. The output of each flip-flop is coupled to an associated relay driver 112A, 122A . . . 182A, respectively, and also to the "set" input of the next flip-flop of the sequence, with the output of the last flip-flop 181 being coupled back to the "set" input of the first flip-flop 111. Only one flip-flop will be active at a time and, accordingly, its corresponding solar air conditioning unit will be in the air drying and cooling phase while all other units are in the desiccant bake-out phase of operation. When the desiccant of the unit in the air drying and cooling phase exceeds a certain moisture level, an output signal from that unit will reset its corresponding flip-flop and return the unit to the desiccant bake-out phase. When the flip-flop output switches the resultant signal at the set input of the next flip-flop causes it to become active which, in turn, causes the corresponding next unit to enter the air drying and cooling phase of operation, and the cycle continues in this manner.

The invention has been described with reference to a particular embodiment, but variations within the spirit and scope of the invention will occur to those skilled in the art. For example, the described structure can be utilized for dehydrating air by eliminating the humidifying step, such as by removing humidifying unit 91. Also, the unit can be used during cold weather, without cycling, for heating. Further, additional steps can be added to the defined cycle, if desired, for example, to cool the desiccant before room air is passed over it.

Also, in the arrangement of FIG. 2, it will be understood that a single set of blowers can be shared as between two or more units using valves to separate the units in different phases of operation. Finally, it will be understood that the defined apparatus can be implemented in various shapes for different applications.

We claim:

1. A method for cooling internal environment air using energy from the sun, comprising the steps of:
 circulating internal environment air over a desiccant to dry the internal environment air;
 cooling the dried room air by performing a heat exchange operation with external environment air;
 adding moisture to the dried internal environment air which was subjected to the heat exchange operation;
 heating the desiccant with solar energy so as to remove moisture from the desiccant; and
 cooling the desiccant by performing a heat exchange with external environment air.

2. The method as defined by claim 1 further comprising repeating the listed steps a desired number of times.

3. The method as defined by claim 1 further comprising repeating the listed steps a desired number of times.

4. The method as defined by claim 1 wherein the two heat exchange operations are performed simultaneously.

5. The method as defined by claim 4, comprising repeating the listed steps a desired number of times.

6. The method as defined by claim 1, comprising repeating the listed steps a desired number of times.

7. The method as defined by claim 1, comprising repeating the listed steps a desired number of times.

8. The method as defined by claim 1, comprising repeating the listed steps a desired number of times.

9. A method of cooling internal environment air using energy from the sun, comprising the steps of:
 (a) simultaneously heating a desiccant with solar energy and exposing the desiccant to external environment air so as to remove moisture from the desiccant;
 (b) circulating internal environment air over the desiccant to dry the internal environment air;
 (c) simultaneously cooling the dried room air and cooling the desiccant by performing a heat exchange with circulating external environment air; and
 (d) adding moisture to the dried room air which was subjected to a heat-exchange operation.

10. The method as defined by claim 9 wherein the steps (b) and (c) include:
 providing a heat-conducting carrier for the desiccant;
 circulating internal environment air over the desiccant on said carrier; and
 circulating external environment air over the back side of said carrier.

11. The method as defined by claim 10 wherein the step (a) includes:
 providing a radiation-transparent enclosure over the back side of said carrier; and
 exposing said radiation-transparent enclosure to solar radiation.

12. A method of drying internal environment air using energy from the sun, comprising the steps of:
 (a) simultaneously heating a desiccant with solar energy and exposing the desiccant to external environment air so as to remove moisture from the desiccant;

(b) circulating internal environment air over the desiccant to dry the internal environment air; and (c) simultaneously cooling the dried room air and cooling the desiccant by performing a heat exchange with circulating external environment air.

13. The method as defined by claim 12 wherein the steps (b) and (c) include:

providing a heat-conducting carrier for the desiccant;

circulating internal environment air over the desiccant on said carrier; and circulating external environment air over the back side of said carrier.

14. The method as defined by claim 13 wherein the step (a) includes:

providing a radiation-transparent enclosure over the back side of said carrier; and exposing said radiation-transparent enclosure to solar radiation.

* * * * *

UNITED STATES PATENT AND TRADEMARK OFFICE
CERTIFICATE OF CORRECTION

PATENT NO. : 4,203,298
DATED : May 20, 1980
INVENTOR(S) : William E. Glenn, Jr., et al It is certified that error appears in the above-identified patent and that said Letters Patent are hereby corrected as shown below:

Col. 6, line 30, change "1" to --9--.

Col. 6, line 32, change "1" to --10--.

Col. 6, line 34, change "1" to --11--.

Signed and Sealed this

Second Day of September 1980

[SEAL]

Attest:

SIDNEY A. DIAMOND

Attesting Officer

Commissioner of Patents and Trademarks